(12) United States Patent
Lee et al.

(10) Patent No.: US 8,469,238 B2
(45) Date of Patent: Jun. 25, 2013

(54) APPARATUS FOR DISPENSING RESIN FLUID

(75) Inventors: Jung-Min Lee, Yongin (KR);
Choong-Ho Lee, Yongin (KR)

(73) Assignee: Samsung Display Co., Ltd.,
Giheung-Gu, Yongin, Gyeonggi-Do (KR)

( * ) Notice: Subject to any disclaimer, the term of this patent is extended or adjusted under 35 U.S.C. 154(b) by 364 days.

(21) Appl. No.: 12/856,298

(22) Filed: Aug. 13, 2010

(65) Prior Publication Data
US 2011/0049192 A1      Mar. 3, 2011

(30) Foreign Application Priority Data

Aug. 26, 2009  (KR) .................. 10-2009-0079465

(51) Int. Cl.
*B65D 83/00*     (2006.01)
*B67D 3/00*      (2006.01)
*B01D 19/00*     (2006.01)

(52) U.S. Cl.
USPC ............. 222/394; 222/504; 222/64; 222/559; 95/266; 95/157

(58) Field of Classification Search
USPC .. 222/1, 64, 190, 394, 504, 559, 389; 95/266; 96/157, 193
See application file for complete search history.

(56) References Cited

U.S. PATENT DOCUMENTS

| | | | |
|---|---|---|---|
| 3,242,643 A | 3/1966 | Moore et al. | |
| 3,621,892 A | 11/1971 | Gillespie | |
| 4,935,151 A * | 6/1990 | Do | 210/739 |
| 5,584,416 A * | 12/1996 | Florian | 222/1 |
| 5,860,737 A * | 1/1999 | Hauser | 366/139 |
| 6,336,959 B1 * | 1/2002 | Kamo | 95/241 |
| 6,500,242 B2 * | 12/2002 | Fu et al. | 96/157 |
| 7,144,442 B2 * | 12/2006 | Hayashi | 95/8 |
| 2001/0037731 A1 | 11/2001 | Sims et al. | |
| 2004/0182887 A1 | 9/2004 | Sugimura et al. | |
| 2009/0289084 A1 | 11/2009 | Kunishi et al. | |

FOREIGN PATENT DOCUMENTS

| | | |
|---|---|---|
| JP | 63-256165 | 10/1988 |
| JP | 63-294964 | 12/1988 |
| JP | 11-76896 | 3/1999 |
| JP | 2000-317377 | 11/2000 |
| JP | 2001-009343 | 1/2001 |
| JP | 2003-11322 | 1/2003 |
| JP | 2008512272 A | 4/2008 |
| KR | 20-0409260 Y | 2/2006 |
| KR | 1020060064541 | 6/2006 |
| KR | 1020070036711 | 4/2007 |
| KR | 10-2008-0002236 | 1/2008 |
| WO | 2006029236 A1 | 3/2006 |

* cited by examiner

*Primary Examiner* — Kevin P Shaver
*Assistant Examiner* — Stephanie E Williams
(74) *Attorney, Agent, or Firm* — Robert E. Bushnell, Esq.

(57) ABSTRACT

A resin fluid dispensing apparatus includes a container having a first volume arranged to receive a resin fluid, a first connection unit connected to the container, a pressure chamber having a second volume configured to connect to the first connection unit and to contain the resin fluid transported from the first volume through the first connection unit, a pressure unit including a pressure plate directly pressurizing the resin fluid in the second volume, a dispenser having a syringe arranged to receive the pressurized resin fluid transported from the second volume through a second connection unit connected to the pressure chamber and to dispense the received pressurized resin fluid through the syringe.

19 Claims, 5 Drawing Sheets

APPARATUS FOR DISPENSING RESIN FLUID

CLAIM PRIORITY

This application reference to, incorporates the same herein, and claims all benefits accruing under 35 U.S.C. §119 from an application earlier filed in the Korean Intellectual Property Office on 26 Aug. 2009 and there duly assigned Serial No. 10-2009-0079465.

BACKGROUND OF THE INVENTION

1. Field of the Invention

The present invention relates to an apparatus for dispensing a degassed resin fluid. More particularly, the described technology relates generally to a resin fluid dispensing apparatus for dispensing a degassed resin fluid between the window and flat panel device constructed with an organic light emitting diode (OLED).

2. Description of the Related Art

In general, a mobile device, such as a mobile phone equipped with a flat panel display (e.g. an organic light emitting diode (OLED) display), further includes a transparent window with a gap interposed between the window and the flat panel display. The transparent window acts to protect the flat panel display device from cracks due to falls and also to prevent contamination of the flat panel display device.

SUMMARY OF THE INVENTION

An object of the present invention is to provide a resin fluid dispensing apparatus to degas a resin fluid and dispensing the degassed resin fluid without apparatus to degas a resin fluid and dispensing the degassed resin fluid without contaminated by entrained air bubbles.

A first embodiment provides a resin fluid dispensing apparatus which includes a container arranged to provide a first volume where a resin fluid is received and to degas the resin fluid is received and to degas the resin fluid by using a degassing unit also located inside the container. A first connection unit is connected to the container and configured to provide the first volume. A pressure chamber is connected to the first connection unit and configured to provide a second volume where the resin fluid is transport from the first volume and through the first connection unit into the second volume. A pressure chamber supports a pressure unit configured to physically have direct contact with the resin fluid in the second volume, and to pressurize the resin fluid by actuating the pressure unit. A second connection unit is connected to the pressure chamber and configured to communicate with the second volume, and a dispenser is connected to the second connection unit and configured to include a third volume to receive resin fluid is transported from the second volume and through the second connection unit to the third volume. The second volume and the third volume are closed and sealed against the outside ambient environment exterior to the second volume and to the third volume, respectively.

The pressure unit may include a pressure plate configured to have physically and direct contact with resin fluid in the second volume of the pressure chamber, a shaft configured to extend between the pressure plate and the outside of the pressure chamber to where the shaft maybe connected to a pressure handle which may be used as a mechanism to apply force to the shaft and the pressure plate, thereby applying pressure to resin fluid resident within the second volume. First elastic units placed between the pressure plate and the pressure chamber and between the shaft and the pressure chamber.

The resin fluid dispensing apparatus may further include second elastic units respectively placed between the contact point between the pressure chamber and the first connection unit and between the contact point between pressure chamber and the second connection unit.

The resin fluid dispensing apparatus may further include a third elastic unit placed between the dispenser and the second connection unit.

The pressure chamber may also include a guide plate placed over the second volume and arranged to be penetrated by the shaft and to guide the shaft, and an oil space separated from the second volume by the guide plate and configured to contain oil.

The pressure chamber may further include a stopper unit situated below the second space configured to protrude inward from the pressure chamber wall. The stopper unit is positioned to limit the downward reciprocation of the pressure unit.

The first connection unit and the second connection unit may be placed under the stopper unit and each are arranged to communicate with the second volume of the pressure chamber.

In a second embodiment, the first connection unit may be is connected to the pressure plate through the guide plate and configured to communicate with the second volume of the pressure chamber, and the second connection unit may be placed under the stopper unit and configured to communicate with the second volume of the pressure chamber.

At least a portion of the pressure chamber may be made of transparent materials.

The container may further include a degassing unit located in the first volume and is used for degassing the resin fluid in the resin fluid in the first volume.

The degassing unit may include a vacuum pump or a centrifugal separator.

The resin fluid is initially contained in the first volume of the container. The container further includes a gas discharge unit connected to the container and configured to discharge air contamination from the degasser unit.

The resin fluid dispensing apparatus may further include a rotary pump that connects to the first connection unit and is configured to transport the resin fluid from the first volume to the second volume.

The dispenser may include a syringe located towards the distal end of the dispenser and configured to have a distally tapering nozzle.

At least portion of the dispenser may be made of transparent material.

According to another embodiment, the resin fluid dispensing apparatus includes a first volume, a second volume, and a third volume that are closed and sealed against the contamination by ambient environments including air. Accordingly, the resin fluid dispensing apparatus can dispense a resin fluid devoid of air bubbles.

A more complete appreciation of the invention, and many of the attendant advantage thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A window-integrated flat panel device has recently been developed. The transparent window is integrated with the flat panel display, by introducing a resin between the window and the display device during the manufacture of the display device. If, as described above, the window is integrated with the flat panel display, the resin placed between the window and the flat panel display functions to absorb external impacts, thereby preventing the flat panel device from being damaged by the external impacts.

The resin used in the manufacture of the window-integrated flat panel device produced by dispensing a resin coating upon the window of the flat panel display. As the resin hardens, it bonds the window together with the flat panel device together. It is important when the resin has been applied as a coating and then hardened between the window and the flat panel device that no air bubbles exist within the hardened resin fluid. Air bubbles within the hardened resin between the window and the flat panel display will distort the image displayed because light generated from the flat panel display will be refracted by the air bubbles within the resin, thereby distorting the image being.

A contemporary resin fluid dispensing apparatus may be configured to perform a degassing process in order to remove air bubble from a resin fluid. While the degassed resin fluid passes through a fluid conduit and through the dispensing apparatus, external air tends to penetrate into the interior of the apparatus and to mix with the resin fluid. The problem therefore is air bubbles contaminating the resin fluid that is thereafter dispensed to coat a window or a flat panel device and those air bubbles distort the images displayed by the device. In particular, because air pressure is often used to pressurize the degassed resin fluid in order to transport the resin fluid through the conduits of the apparatus, the gas that is used as the air pressure then penetrates into the resin fluid, thus creating air bubbles that contaminate the resin fluid.

Hereinafter, the present invention will be described in detail with reference to the accompanying drawings, in which exemplary embodiments of the invention are shown. As those skilled in the art would realize, the described embodiments may be modified in various different ways, all without departing from the spirit or scope of the present invention.

Furthermore, in the several exemplary embodiments, constituent elements having the same construction are assigned the same reference numerals and are representatively described in a first exemplary embodiment. In a second exemplary embodiment, only differences between the first and second exemplary embodiments are described.

It will be understood that when an element is referred to as being "over" or "under" another element, it can be "under" or "over" the other element with or without intervening elements.

Hereinafter, a resin fluid dispensing apparatus constructed as a first exemplary embodiment is described with reference to FIGS. 1 thru 3, and 5, inclusive.

Figure 1:
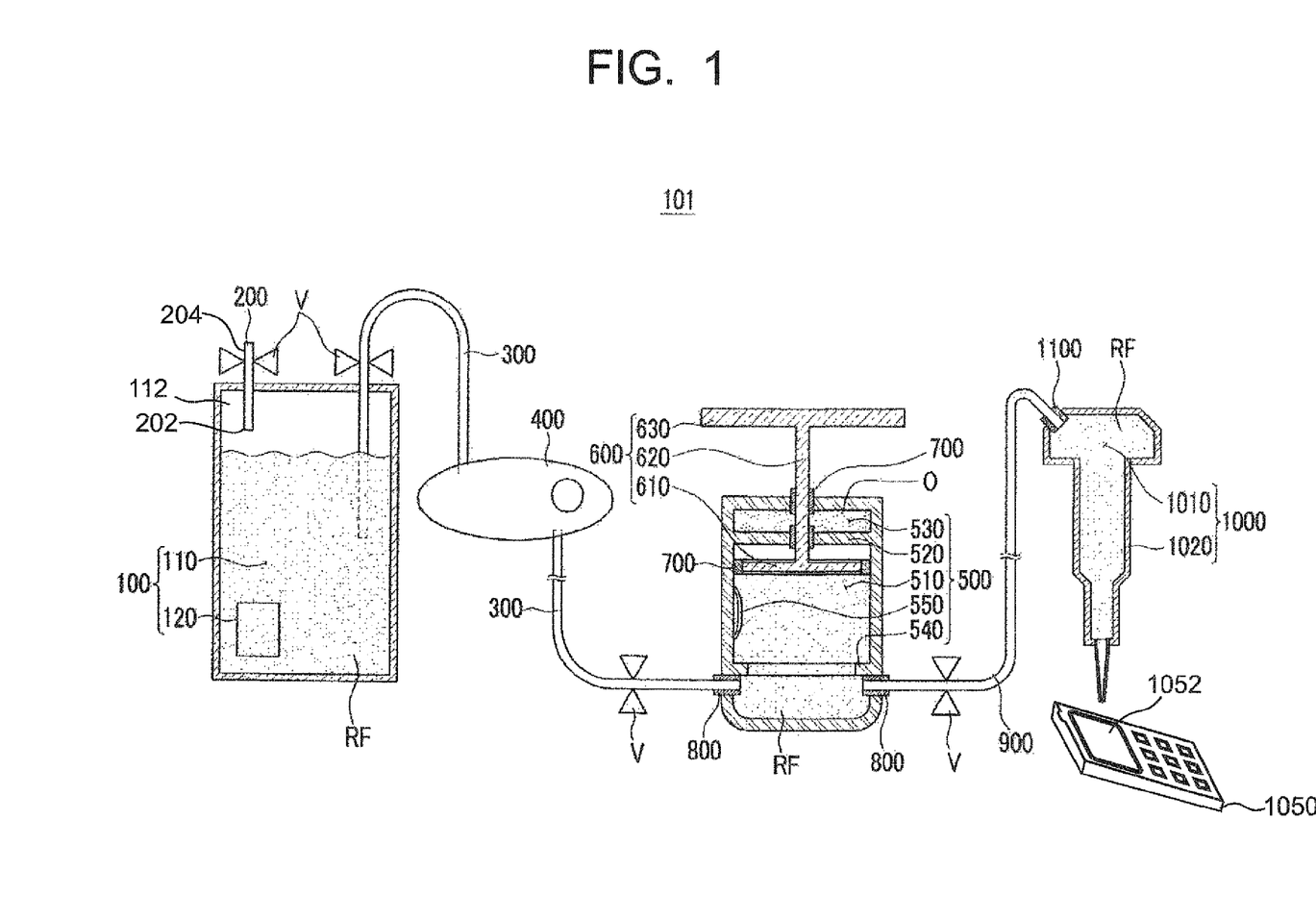
FIG. 1 is a schematic diagram showing a resin fluid dispensing apparatus constructed as first exemplary embodiment of the invention.

FIG. 1 is schematic plan view of a resin fluid dispensing apparatus of the first embodiment.

Referring to FIG. 1, the resin fluid dispensing apparatus 101 according to the first exemplary embodiment dispenses a resin fluid RF, and includes a storage unit 100, a gas discharge unit 200, a first connection unit 300, a rotary pump 400, a pressure chamber 500, a pressure unit 600, first elastic units 700, second elastic units 800, a second connection unit 900, a dispenser 1000, and a third elastic unit 1100.

Figure 5:
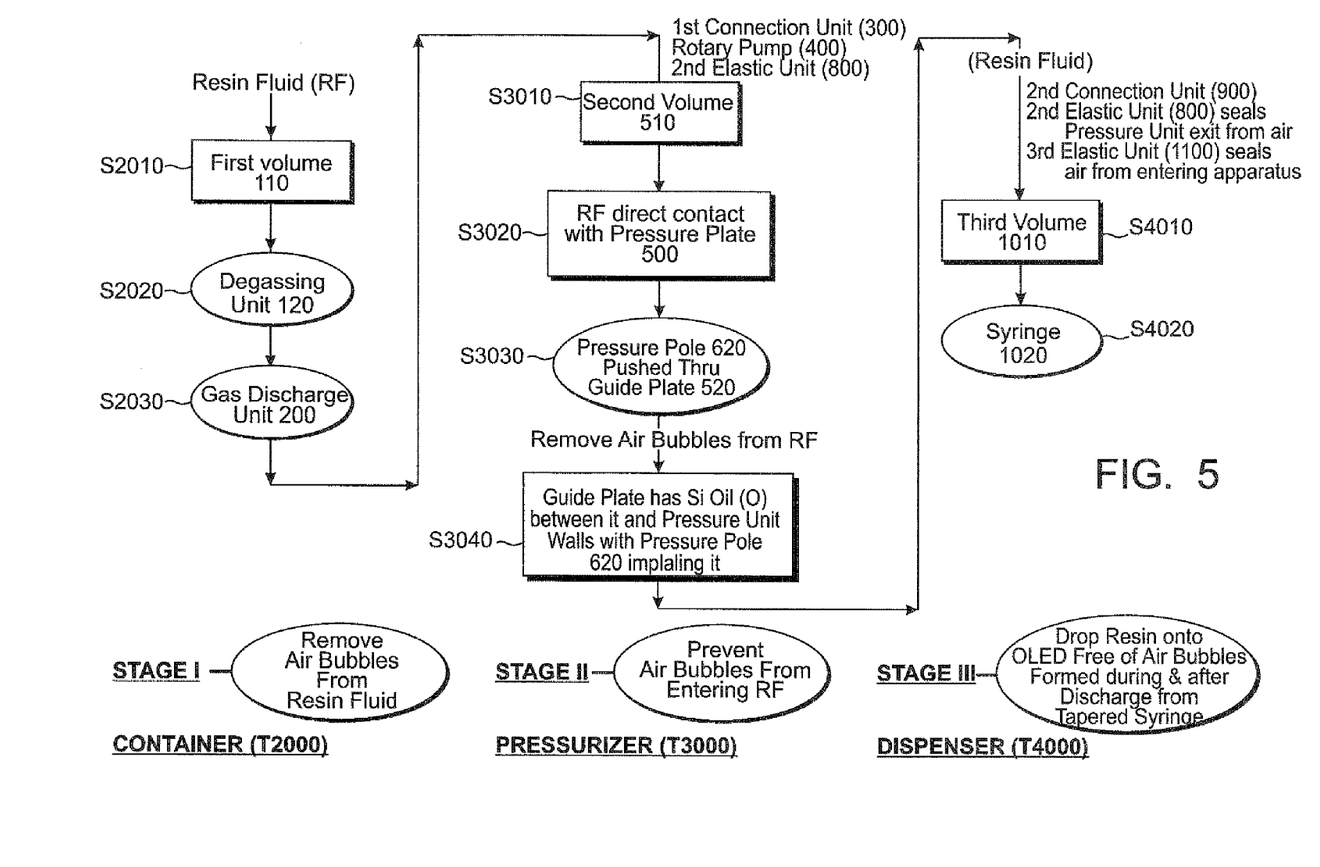
FIG. 5 is a flow chart-diagram depicting the movement of resin fluid through the resin dispensing apparatus of FIG. 1.

FIG. 5 is a flow chart showing the movement of the resin fluid through the resin fluid dispensing apparatus.

Container 100 is a storage unit in a vessel for first storing the resin fluid RF in the apparatus, including a first volume 110, and a degassing unit 120.

First volume 110 is a space formed by the container 100, and the resin fluid RF is placed within the first space 110. Resin fluid RF that will be degassed by the degassing unit 120 is placed in a portion of the first volume 110, and gas that is degassed from the resin fluid RF is placed in the other portion 112 of container 100 located above the first space 110.

Degassing unit 120 degasses the resin fluid RF and may include a vacuum pump or a centrifugal separator. Alternatively, degassing unit 120 may be placed outside of container 100. In this case, a connecting portion such as a tube connects degassing unit 120 and first space 110 of the container 100 so that the resin fluid RF within the first space 110 is moved to the degassing unit 120 and then degassed.

Gas discharge unit 200 is connected to container 100, and is configured to communicate with the portion 112 of the container 100 that is not occupied by the gas extracted from the resin fluid during the degassing process; that gas from the resin fluid RF is placed (within the container but outside the part of the volume containing the resin fluid) in the first volume 110 of the container 100. The gas discharge unit 200 communicates with the other portion of the first volume 110, and discharges the gas from the resin fluid RF to the environment outside of resin fluid dispensing apparatus 101. As shown, a lower terminal intake end 202 of gas discharge unit 200 is positioned within container 100, just above the first volume 110 occupied by resin fluid RF. The discharge or upper terminal end 204 of gas discharge unit 200 is positioned to exhaust gas produced by degassing unit 120 to the environment outside of container 100. Opening and shutting of the gas discharge unit 200 are performed by first valves V.

Figure 2:
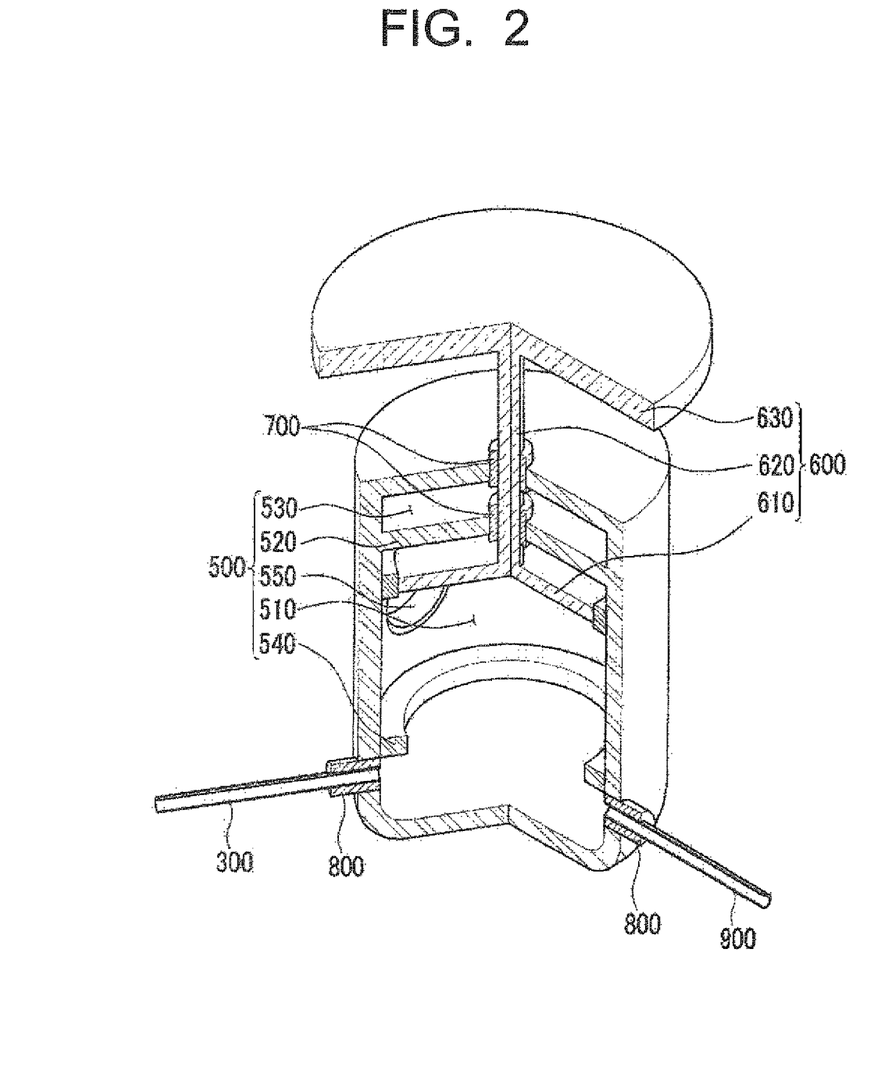
FIG. 2 is a partial cut-away view of a pressurizer for of the resin dispensing apparatus of FIG. 1.
Figure 4:
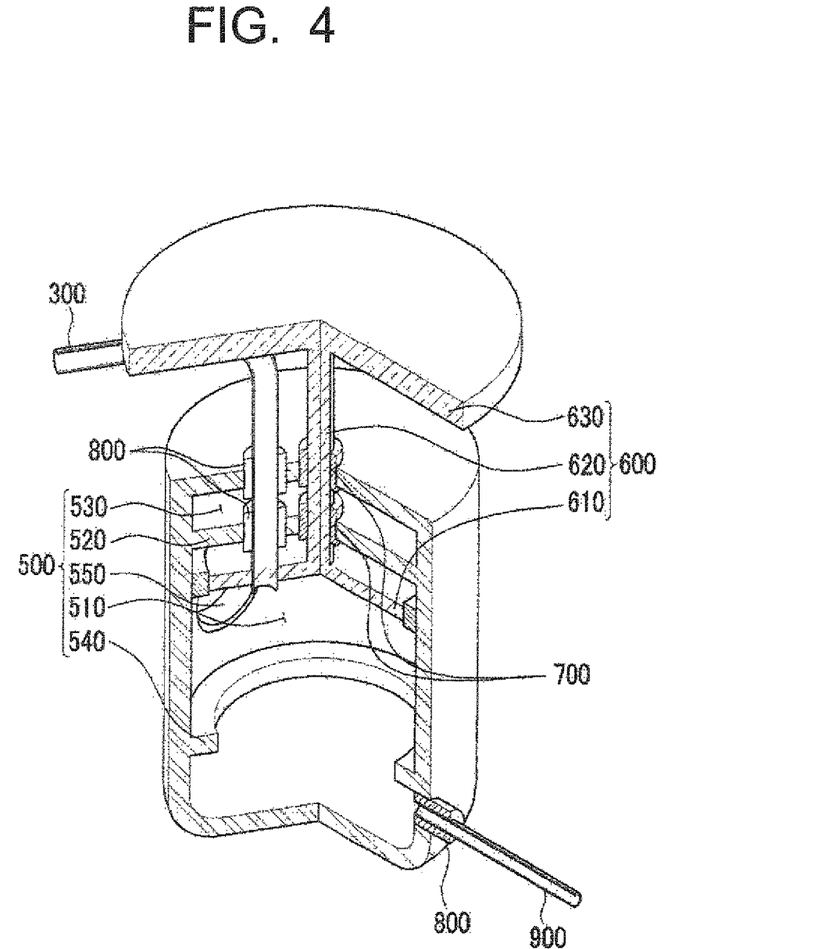
FIG. 4 is a partial cut-away view of a pressurizer for the resin dispensing apparatus of FIG. 1 constructed as second exemplary embodiment.

Referring respectively to FIGS. 2 and 4, the pressurizing units according to the first and second embodiments include a pressure chamber 500, a pressure unit 600, first elastic units 700 and second elastic units 800.

Pressure chamber 500 includes a second volume 510, a guide plate 520, an oil space 530 and a stopper unit 540. The pressure unit 600 includes a pressure plate 610, a shaft 620 and a pressure handle 630. The pressure plate 610 is located within the inner wall of the pressure chamber 500 and moved between the guide plate 520 and the stopper unit 540. Stopper unit 540 may be formed as an internal, circular rim that defines the upper limit of the second volume 510 contained within the walls of the pressure chamber 500 (S3030). The shaft 620 can be moved by reciprocation, through the guide plate 520 (S3030). Pressure handle 630 is located outside and above pressure chamber 500. The first elastic units 700 are situated between the outer circumference of the pressure plate 610 and the inner walls of the pressure chamber 500 and seal the second volume from contamination from outside the second volume 550. Stopper unit 540 limits the downward travel of pressure plate 610 during reciprocation.

In the first embodiment in FIG. 2, the first connection unit 300 is connected to the second volume 510 inside the pressure chamber 500, and below the stopper 540 unit, through which the degassed resin fluid is transported into the second volume 510. A second elastic unit 800 is located between the outer circumference of the first connection unit 300 and the pressure chamber 500 in order to seal the second volume 510 from contamination from outside the second volume. A second elastic unit 800 is located between the outer circumference of the second connection unit 900 and the pressure chamber 500 in order to seal the second volume 510 from contamination from outside the second volume 510. It may be noted that first and second elastic units 800 are collars which may be employed as airtight seals between the walls of pressure unit 608 and the walls of second and third connection units 300, 900.

In the second embodiment shown in FIG. 4, the first connection unit 300 is located below the pressure handle 630 and is connected to the pressure chamber 500 with a second elastic unit 800 positioned as an airtight seal between the walls of the first connection unit 300 and the walls of pressure chamber 500. Additionally, a second elastic unit 800 is located between the first connection unit 300 and the guide plate 520 in order to seal the second volume 510 from contamination from the exterior environment.

The first connection unit 300 is connected to the container 100 and is arranged to communicate and convey the degassed resin fluid from first space 110 of the container 100. The first connection unit 300 connects the container 100 and the pressure chamber 500, so that the first volume 110 of the container 100 and to a second volume 510 of the pressure chamber 500. In more detail, rotary pump 400 may be connected to the first connection unit 300. The first connection unit 300 provides communication between the rotary pump 400 and the first space 110 of the container 100 and between the rotary pump 400 and the second volume 510 of the pressure chamber 500 (S3010). Opening and shutting of first connection unit 300 are performed by the first valves V. The communication that the first connection unit 300 provided between the container 100 and the pressure chamber 500 transports the degassed resin fluid RF, placed in the first volume 110 to the second volume 510. The second elastic units 800 are placed between the first connection unit 300 and the pressure chamber 500. The second elastic units 800 function to close and from airtight seals between the first connection unit 300 and the second volume 510 of the pressure chamber 500 from contamination from the environment outside apparatus 101.

The rotary pump 400 is connected to the first connection unit 300, and is configured to transport the resin fluid RF from the first volume 110 of the container 100 to the second volume 510 of the pressure chamber 500 through the first connection unit 300 by pumping. The rotary pump 400 may be placed at the middle portion of the first connection unit 300, as shown in FIG. 1, or can be connected to the first connection unit 300 by an additional or intermediate connecting portion so that the resin fluid RF will be pumped from first volume 110 to the second space 510.

Pressure chamber 500 is described below with reference to FIG. 2.

FIG. 2 is a diagram showing the pressure chamber illustrated in FIG. 1.

Referring to FIG. 2, the pressure chamber 500 includes the second volume 510, a guide plate 520, an oil space 530, a stopper unit 540, and a chamber window 550.

The second volume 510 is formed by the walls of pressure chamber 500. Second volume 510 is configured to communicate with the first connection unit 300, through which of the degassed resin fluid RF is transported from the first volume 110 of the container 100 to the second volume 510 via the first connection unit 300. The second volume 510 communicates with the third connection unit 900.

The pressure unit 600 includes a pressure plate 610, shaft 620, and a pressure handle 630. The pressure unit 600 is supported by pressure chamber 500 and is configured to pressurize the interior of pressure unit 600 and the resin fluid resident within pressure unit 600 by directly and physically contacting the resin fluid RF placed within the second volume 510. The pressure plate 610 directly pressurizes the resin fluid RF by way of the reciprocation of shaft 620. First elastic units 700 are placed between the pressure plate 610 and pressure chamber 500 to serve as piston rings that serve as airtight seals during reciprocation of pressure plate 610. The first elastic units 700 cause the second volume 510 that is reduced by the pressurization of the pressure plate 610 to be closed and sealed against the outside.

The guide plate 520 is located above second volume 510 and is configured to have a shaft 620 for pressure unit 600 penetrate therethrough. Guide plate 520 guides shaft 620 during reciprocation. Oil space 530 is formed in the pressure chamber 500 and is separated from the second volume 510 by a guide plate 520. The first elastic units 700 are placed between the guide plate 520 and shaft 620, and they function to close and form an airtight seal the second volume 510 from entrance of contamination from the outside environment. The first elastic units 700 also the second volume 510 from the oil held within space 530.

The oil space 530 is separated from the second volume 510 with the guide plate 520 interposed therebetween, wherein the oil O such as silicon oil. The oil O filling the oil space 530 functions to close and seal the second volume 510 from the outside environment. Further, when the shaft 620 of the pressure unit 600 reciprocates, the oil O adheres to a surface of the pressure pole 620 and functions to reduce frication force between the first elastic units 700 and the shaft 620. Moreover, the oil O in the oil space 530 functions to preclude external air that may enter the second volume 510 through a gap between the pressure unit 600 and the first elastic units 700 during the reciprocation of the pressure unit 600 (S3040).

The stopper unit 540 protrudes from the pressure chamber 500 inward towards the axial center of the second volume 510, and functions to stop the downward actuation of the pressure unit 600. Stopper unit 540 is placed above and over both the first connection unit 300 and the second connection unit 900. When the pressure unit 600 comes into contact with the stopper unit 540, the degassed resin fluid RF resident within pressure chamber 500 is transported from the second volume 510 and is received in the third volume 1010 of dispenser 1100 via the second connection unit 900.

The chamber window 550 made of a transparent material constitutes a part of the pressure chamber 500. Whether air bubbles exist within the resin fluid RF placed within the second space 510 of the pressure chamber 500 can be determined through the chamber window 550.

In another embodiment; all materials constituting the outer wall of the pressure chamber 500 may be manufactured from transparent materials so that the entire inside of the pressure chamber 500 can be viewed.

The pressure unit 600 is supported by the pressure chamber 500 and is configured to pressurize the resin fluid RF placed within the second space 510. The pressure unit 600 includes a pressure plate 610, the pressure pole 620, and a pressure handle 630.

The pressure plate 610 physically has direct contact with the resin fluid RF placed in the second space 510 of the pressure chamber 500. The pressure plate 610 directly pressurizes the resin fluid RF by way of the reciprocation of the pressure pole 620. The first elastic units 700 are placed between the pressure plate 610 and the pressure chamber 500.

The first elastic units 700 cause the first space 110 that is reduced by the pressurization of the pressure plate 610 to be closed and sealed against the outside.

The shaft 620 penetrates the pressure chamber 500 from the pressure plate 610 and extends externally to the pressure handle 630. The first elastic units 700 are placed between the shaft 620 and the pressure chamber 500. The first elastic units 700 cause the oil space 530 and the first volume 110 to be closed and sealed against a contamination from the outside environment.

The pressure handle 630 is placed at the end of the shaft 620 that extends externally and is pressurized by air pressure or mechanical pressure such as pump. As the pressure handle 630 is moved as by the pump, the shaft 620 reciprocates, and so pressure plate 610 placed in the second volume 510 pressurizes the resin fluid RF by making direct contact with the resin fluid RF.

As described above, pressure unit 600 physically has direct contact with the resin fluid RF placed within second volume 510 of the pressure chamber 500, and pressurizes the resin fluid RF through reciprocation. The first elastic units 700 are placed to form airtight seals between the pressure unit 600 and the pressure chamber 500, thus precluding external air contamination from entering the first volume 110. Further, when the shaft 620 of the pressure unit 600 reciprocates from the outside to the second volume 510 of the pressure chamber 500 via the oil space 530, the oil O of the oil space 530 adheres to the surfaces of the shaft 620. Accordingly, friction forces between the shaft 620 and the first elastic units 700 can be reduced, making the reciprocation of the pressure unit 600 smoother relative to pressure chamber 500. Further, the oil O placed in oil space 530 prevents contamination by air that may enter from the outside to the first volume 110 because of the reciprocation of the shaft 620; this contamination may be precluded by the oil O placed in the oil space 530.

Moreover, since the pressure unit 600 pressurizes the resin fluid RF through reciprocation, the amount of the resin fluid RF coated by the dispenser 1000 can be increased according to a distance of travel by the pressure unit 600. That is, because the amount of the coated resin fluid RF is linearly increased in response to the distance of the pressure unit 600. There for the amount of the coated resin fluid RF can be controlled by controlling the reciprocation of the pressure unit 600.

The first elastic units 700 are placed to form airtight seals between the pressure unit 600 and the pressure chamber 500.

The first elastic units 700 are made of elastic materials such as rubber. The first elastic units 700 are placed between the walls of pressure chamber 500 and pressure unit 600, and function to close and seal the second volume 510 of the pressure chamber 500 from contaminations from the environment outside of the apparatus. In more detail, the first elastic units 700 are placed between the shaft 620 and the guide plate 520, and between the pressure plate 610 and the pressure chamber 500.

The second elastic units 800 are made of elastic materials such as rubber. The second elastic units 800 are placed between the pressure chamber 500 and the first connection unit 300 and also between the pressure chamber 500 and the second connection unit 900. The second elastic units 800 function to close and seal the second volume 510 of the pressure chamber 500 against the outside environment.

Referring back to FIG. 1, the second connection unit 900 is connected to the pressure chamber 500 and is configured to communicate with the second volume 510 of the pressure chamber 500. The second connection unit 900 connects the pressure chamber 500 and the dispenser 1000 and transports RF fluid from second volume 510 of the pressure chamber 500 to the third volume of the dispenser 1000. Opening and shutting of the second connection unit 900 is performed by a second valve V. Such communication between the pressure chamber 500 and the dispenser 1000 provided by the second connection unit 900 causes the resin fluid RF, placed in the second volume 510 of the pressure chamber 500 and pressurized by the reciprocation of the pressure unit 600, to move into a third volume 1010 of the dispenser 1000 through the second connection unit 900. Second elastic units 800 are placed between the second connection unit 900 and the pressure chamber 500. The second to form airtight seals between second connection unit 900 and pressure chamber 500. Second elastic units 800 assure that second connection unit 900 and the second volume 510 of the pressure chamber 500 to be closed and sealed against entry of air and contaminants from the environment exterior to pressure chamber 500.

The dispenser 1000 is described below with reference to FIG. 3.

Figure 3:
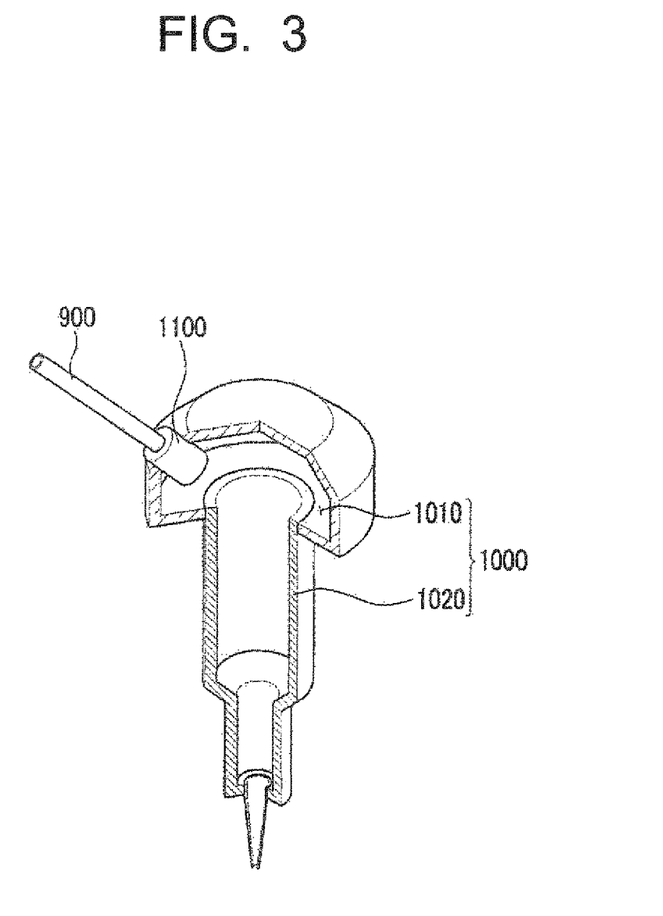
FIG. 3 is a partial cut-way view of the dispenser of FIG. 1.

FIG. 3 is a diagram showing the disperser of FIG. 1.

Referring to FIG. 3, the dispenser 1000 is connected to the second connection unit 900 and is configured to include the third volume 1010 and a syringe 1020.

The third volume 1010 is formed by dispenser 1000. The third space 1010 communicates with the second connection unit 900. Thus, the resin fluid RF pressurized by the pressure unit 600 is moved from the second space 510 of the pressure chamber 500 and then placed in the third space 1010 via the second connection unit 900. The syringe 1020 is placed at the end of the dispenser 1000.

A part or all of the syringe 1020 may be made from of transparent materials such that the resin fluid RF placed in the third space 1010 can be monitored through the walls of syringe 1020. The syringe 1020 is tapered and dispenses the resin fluid RF in a direction where taper is narrowed, in order to dispense the resin fluid RF (S4020).

The third elastic unit 1100 is arranged between the dispenser 1000 and the second connection unit 900.

The third elastic unit 1100 is made of elastic materials such as rubber. The third elastic unit 1100 is placed between dispenser 1000 and second connection unit 900, and functions to close and form as airtight seal the third volume 1010 of the dispenser 1000 against contamination that might otherwise enter dispenser 1000 from the outside.

As described above, referring to the resin fluid dispensing apparatus 101 in accordance with the first embodiment in FIG. 1, the resin fluid RF is degassed in the first space 110 (S2020). The resin fluid is in direct physical contact with the pressure unit 600 in order to pressurize the resin fluid in the second volume 510, so that is closed and sealed against contamination from the outside. The pressurized resin fluid RF is moved into the third volume 1010 that is sealed against the outside where the resin fluid is then dispensed. Accordingly, air bubbles do not exist within the dispensed resin fluid RF. In particular, not air pressure, but rather by using the pressure unit 600 to come into direct physical contact with the resin fluid RF air or other contaminants that would have otherwise have become mixed and entrained within the resin fluid when used pressurize the resin fluid RF, are now eliminated from the process. Accordingly, the pressurization of the resin fluid does not generate air bubbles that are entrained in the resin fluid.

Further, oil space 530 is separated from the second space 510, is placed over the second volume 510, and oil space 530 is filled with oil O. Accordingly, when the pressure unit 600 is reciprocated to apply pressure to the resin fluid RF, oil O filling in the oil space 530 precludes external air from entering the second volume 510, and prevents the generation of air bubbles in the resin fluid, which may otherwise enter due to the reciprocation of the pressure unit 600. Hereinafter, a method of manufacturing a window-integrated flat panel display using the resin fluid dispensing apparatus 101 according to the first exemplary embodiment is described.

An example in which an OLED display is used as the flat panel display is described. The flat panel display is not limited to the OLED display, but may include a liquid crystal display (LCD), a plasma display panel (PDP), or a field emission display.

First, the OLED display and a window that can be coalesced with the OLED display are by using resin fluid is prepared.

Here, the window can be made of transparent materials such as plastic or glass.

A resin fluid RF is dispensed on a surface of the OLED display device 1050 or the window 1052 of display device 1050 from the tapered, distal end of dispenser 1000 for the resin fluid dispensing apparatus 101.

A method of dispensing the resin fluid RF by using the resin fluid dispensing apparatus 101 is described in more detail below.

First, in the state in which the first valve V coupled to the first connection unit 300 is closed and the first valve V coupled to the gas discharge unit 200 is opened in step S2030, the degassing unit 120 is driven to degas the resin fluid RE placed in the first volume 110 of the container 100 during step S2020. In this case, resin degassing is sufficiently performed the resin fluid RF does not include entrained air bubbles. Gases that are degassed from the resin fluid RF are discharged externally to the environment through gas discharge unit 200.

Next, when first valve V coupled to the gas discharge unit 200 is closed and first valve V coupled to the first connection unit 300 is opened, the rotary pump 400 is driven to transport the degassed resin fluid RF from the first volume 110 of the container 100 to the second volume 510 of the pressure chamber 500 through the first valves V, in steps S2030 through S3010 (S2030 to S3010).

When the second space 510 of the pressure chamber 500 is filled with the degassed resin fluid RF, and the first valves V are both closed and the second valve V is open, pressure unit 600 is reciprocates so that the pressure plate 610 applies direct pressure (S3020) to pressurize the resin fluid. RE filled in the second volume 510 of the pressure chamber 500 (S3030). The applied pressure unit 600 on the degassed resin fluid RE causes the RF to moved from the second volume 510 of the pressure chamber 500 to the third volume 1010 of the dispenser 1000 via the second connection unit 900 (S4010). The resin fluid, RE, is transported through the apparatus and is received into the third volume of the dispenser which dispenser degassed resin fluid through a syring body (S4020) onto a surface of the flat panel display or the window, thereby coating either the display or the window with resin fluid.

The amount of the resin fluid RF coated by the dispenser 1000 onto a surface of OLED display device 1050 or on window 1052 by dispenser 1000 is controlled depending on [a moving distance of the pressure unit 600 based on] the reciprocation of the pressure unit 600. That is, the amount of the coating resin fluid RF dispensed via the dispenser 1000 is linearly proportional to distance moved by the pressure unit 600.

According to the above process, the degassed resin fluid RF is coated on the surface of the display or the window.

When the resin fluid RF is arranged between the OLED display device and the window, the OLED display and the window are bonded together as the resin fluid RF hardens.

The window-integrated flat panel display device is thereby fabricated.

FIG. 4 is a diagram showing the pressure chamber of the resin fluid dispensing apparatus according to the second exemplary embodiment.

The first connection unit 300 of the resin fluid dispensing apparatus 101 according to the second exemplary embodiment is configured to penetrate the oil space 530 and the guide plate 520 of a pressure chamber 500, and is connected to the pressure plate 610 of a pressure unit 600. The first connection unit 300 is connected to the pressure plate 610 and is configured to communicate with the second space 510 of the pressure chamber 500. Second elastic units 800 are placed between the first connection unit 300 and the pressure chamber 500 and are arranged to seal the second space 510 against contamination from the outside.

In the resin fluid dispensing apparatus 101 according to the second exemplary embodiment, the first connection unit 300 is placed over the pressure chamber 500, and a second connection unit 900 is placed on the lower side of the pressure chamber 500 below the stopper unit 540. Accordingly, if external air contaminates the second volume 510, the entrained air bubbles can be removed from the resin fluid when the resin fluid is received into the third space 1010 of the dispenser 1000 through the second connection unit 900.

A resin fluid dispensing apparatus includes a container arranged to receive a resin fluid, a first connection unit connected to the container, a pressure chamber arranged to contain the resin fluid transported through the first connection unit from the first volume received into a second volume in a pressure chamber. A pressure unit comprising a pressure plate directly pressurizing the resin fluid in the second volume. A dispenser arranged to receive the pressurized resin fluid transported from the second volume through a second connection unit connected to the pressure chamber. The dispenser dispensing the received pressurized resin fluid through a syringe.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resin fluid dispensing apparatus, comprising:
a container configured to provide a first volume and to degas a resin fluid within the first volume;
a first connection unit operationally communicating with the first volume;
a pressure chamber connected to the first connection unit; and configured to comprise a second volume that receives degassed resin fluid from the first volume via the first connection unit;
a pressure unit supported by the pressure chamber and configured to physically have direct contact with the resin fluid resident within the second volume, and to pressurize the resin fluid within the second volume through reciprocation;
a second connection unit operationally communicating from the second volume; and
a dispenser including a third volume to receive the resin fluid moved from the second volume through the second connection unit, wherein
the second volume and the third volume being closed and sealed against environments exterior to the resin fluid dispensing apparatus; and the pressure unit comprises a pressure plate being in direct contact with the resin fluid within the second volume; a shaft extending from the pressure plate to an environment outside of the pressure chamber; and a plurality of first elastic units arranged to form seals between the pressure plate and the pressure chamber and between the shaft and the pressure chamber, the first elastic units sealing the pressure chamber from the environment, exterior to the fluid dispensing apparatus.

2. The resin fluid dispensing apparatus of claim 1, further comprising a plurality of second elastic, units arranged between the pressure chamber and the first connection unit and between the pressure chamber and the second connection unit to form seals between the first connection unit and the pressure chamber and between the second connection unit and the pressure chamber respectively.

3. The resin fluid dispensing apparatus of claim 2, further comprising a third elastic unit, forming a seal between the dispenser and the second connection unit.

4. The resin fluid dispensing apparatus of claim 3, wherein the pressure chamber further comprises:
   a guide plate arranged over the second volume;
   a shaft extending through the guide plate and being guide by the guide plate during said reciprocation of said pressure unit; and
   an oil space separated from the second volume by the guide plate and configured to contain oil.

5. The resin fluid dispensing apparatus of claim 4, wherein the pressure chamber further comprises a stopper unit protruding from an inner wall of the pressure chamber toward the second volume to stop the reciprocation of the pressure unit.

6. The resin fluid dispensing apparatus of claim 5, wherein the first connection unit and the second connection unit are arranged underneath the stopper unit and configured to communicate with the second volume of the pressure chamber.

7. The resin fluid dispensing, apparatus of claim 5, wherein
   the first connection unit being, connected to the guide plate to communicate with the second volume of the pressure chamber, and
   the second connection unit being disposed beneath the stopper unit to communicate with the second volume of the pressure chamber.

8. The resin fluid dispensing apparatus of claim 1, wherein at least a portion of the pressure chamber is comprised of transparent material.

9. The resin fluid dispensing apparatus of claim 1, wherein the container further comprises a degassing unit disposed to degas the resin fluid.

10. The resin fluid dispensing apparatus of claim 9, wherein the degassing unit comprises a device selected from a group consisting of a vacuum pump and a centrifugal separator.

11. The resin fluid dispensing apparatus of claim 1, wherein the first volume includes a first portion and a second portion, the resin fluid within the first volume being arranged only within the first portion, the resin fluid dispensing apparatus further comprising a gas discharge unit connected to the container and configured to communicate between a second portion of the first volume and the environments exterior to the resin fluid dispensing apparatus.

12. The resin fluid dispensing apparatus of claim 1, further comprising a rotary pump connected to the first connection unit to move the resin fluid within the first volume to the second volume.

13. The resin fluid dispensing apparatus of claim 1, further comprising a syringe arranged at a terminal end of the dispenser and configured with a tapered shape.

14. The resin fluid dispensing apparatus of claim 13, wherein at least a portion of the dispenser is of transparent.

15. A resin fluid dispensing apparatus, comprising:
   a container including a degassing unit and a first volume disposed to degas resin fluid held within;
   a gas discharge unit attached to the container to discharge gas from the degassing unit;
   a pressure chamber including a second volume for receiving degassed resin fluid from the first volume, the pressure chamber further including a pressure unit to apply pressure directly to the resin fluid within the second volume, the second volume being closed and sealed from an ambient environment exterior to the fluid dispensing apparatus;
   a dispenser containing a third volume and having a syringe the third volume receiving the degassed resin fluid under pressure from the second volume, and enabling the syringe to dispense from the third volume pressurized degassed resin received from the second volume.

16. The resin fluid dispensing apparatus of claim 15, wherein the pressure unit comprises:
   a pressure handle;
   a shaft connected to the pressure handle; and
   a pressure plate connected to the shaft, disposed to maintain direct contact with resin fluid within the second volume and to pressurize resin fluid within the second volume by reciprocation of the pressure plate.

17. The resin fluid dispensing apparatus of claim 16, further comprising transporting the resin fluid as pressurized degassed resin fluid from the second volume to the third volume hermetically.

18. The resin fluid dispensing apparatus of claim 17, wherein the pressure chamber further comprises:
   an oil space containing oil; and
   a guide plate arranged between the second volume and the oil space, wherein the shaft of the pressure unit extends through the guide plate, the guide plate to guide the pressure unit during said reciprocation.

19. The resin fluid dispensing apparatus of claim 18, wherein the pressure chamber further comprises a stopper unit protruding inward from an inner wall of the pressure chamber and to stop a downward reciprocation movement of the pressure plate during, said reciprocation of the pressure unit.

* * * * *